United States Patent [19]

Watzka et al.

[11] 4,228,901
[45] Oct. 21, 1980

[54] SEPARATOR DEVICE FOR ELONGATE OBJECTS ADVANCING ALONG A CONVEYING PATH

[75] Inventors: Roland Watzka, Feuerthalen; Henri Bartholmé, Neuhausen am Rheinfall, both of Switzerland

[73] Assignee: SIG Schweizerische Industrie-Gesellschaft, Neuhausen am Rheinfall, Switzerland

[21] Appl. No.: 972,369

[22] Filed: Dec. 22, 1978

[30] Foreign Application Priority Data

Dec. 29, 1977 [CH] Switzerland .................. 16207/77

[51] Int. Cl.³ .................. B07C 9/00; B65G 25/04; B65H 5/00
[52] U.S. Cl. .................. 209/684; 198/426; 198/489; 198/492; 209/911; 221/93; 221/233; 221/251
[58] Field of Search .............. 209/659, 684, 686, 911, 209/651–654; 198/426, 429, 432, 489, 490, 492; 221/93, 233, 238, 251, 264; 414/276, 330, 129

[56] References Cited

U.S. PATENT DOCUMENTS

| 1,726,054 | 8/1929 | Burns | 221/251 |
| 2,792,922 | 5/1957 | Malhiot | 221/93 X |
| 3,749,242 | 7/1973 | Eckstein | 209/659 X |

*Primary Examiner*—Robert J. Spar
*Assistant Examiner*—Edward M. Wactra
*Attorney, Agent, or Firm*—Spencer & Kaye

[57] ABSTRACT

A separator device for separating from a succession of objects in a conveying path those objects having less than a desired length in the conveying direction, including an input channel via which the objects are conveyed to the separator device, an abutment member located downstream of the input channel for limiting movement of each object leaving the channel, a discharge path located below the input channel for conveying objects away from the device, and a mechanism which transfers each object in turn from the input channel to the discharge path while separating out each object which immediately follows an object being thus transferred and which has less than the desired length.

6 Claims, 11 Drawing Figures

4,228,901

SEPARATOR DEVICE FOR ELONGATE OBJECTS ADVANCING ALONG A CONVEYING PATH

BACKGROUND OF THE INVENTION

The present invention relates to a device disposed in a conveying path for elongate objects having a desired length in the conveying direction for separating objects whose length is less than that desired from the conveying path.

U.S. Pat. No. 4,101,420, issued to Pierre Luginbuhl on July 18th, 1978, discloses apparatus for aligning elongate objects with their long dimension oriented transversely to the conveying direction and for separating out objects of unacceptable small length. While this apparatus functions well, it has been found to be too expensive, in consideration of the function which it performs. Moreover, in many cases it is simpler to convey elongate objects in their longitudinal direction, as this is the custom, for example, when introducing candy-covered chewing gum into packaging machines.

Although such confections generally hold their shape quite well, it may happen that shorter pieces, particularly broken pieces, come to lie between pieces of normal length. It has been found that such pieces can produce considerable malfunctions in packaging machines, requiring cleaning operations that entail long down times. Even though this happens only rarely, it is very desirable to prevent such malfunctions with the greatest possible certainty. While it might be possible to monitor the length of the individual objects by means of sensors, e.g. electric eyes, devices for performing this operation would be rather complicated and expensive.

SUMMARY OF THE INVENTION

It is an object of the invention to remove unacceptably short objects from a conveying path by simple and inexpensive apparatus.

A specific object of the invention is to effect such removal from a conveying path in which the objects are being conveyed in their longitudinal direction.

These and other objects are achieved, according to the invention, by a separator device arranged to be disposed in a conveying path for elongate objects each having a desired length, which device includes means defining an inclined input path presenting at least one channel presenting an object support surface along which a succession of such objects slide downwardly in the direction of their longitudinal dimension; a fixed abutment member disposed downstream of, and in line with, the input path for limiting the movement of an object exiting from the channel; means defining a discharge path for discharging objects in succession from the device, the discharge path presenting an object support surface spaced below the lower extremity of the abutment member by a distance at least equal to the vertical dimension of each object; a pivotally movable plate located between the outlet end of the channel and the abutment member and movable between a raised position in which it is aligned with the support surface of the channel and a lowered position in which it is aligned with the support surface of the discharge path, movement of the movable plate from its raised to its lowered position acting to cause an object located between the outlet end of the channel and the abutment member to move downwardly while sliding along the abutment member into alignment with the discharge path; a pusher member movable for pushing an object which is thus aligned with the discharge path beneath the abutment member and onto the discharge path; a clamping strip movable between a retracted position in which it permits downward sliding movement of objects along the channel and a clamping position in which it blocks such movement, the strip being located relative to the outlet end of the channel such that, when an object having the desired length is positioned against the abutment member, and when the strip is in its clamping position, the strip will clamp the next following object if it has the desired length but not if it has less than the desired length; clamping control means connected to the strip to move it from its retracted position to its clamping position at the start of movement of the movable plate from its raised position to its lowered position in order to permit a next following object having less than the desired length to exit from the channel; and a movable member disposed for separating from the conveying path an object which has exited from the channel after the start of movement of the movable plate from its raised position to its lowered position.

DESCRIPTION OF THE PREFERRED EMBODIMENTS

Figure 1:
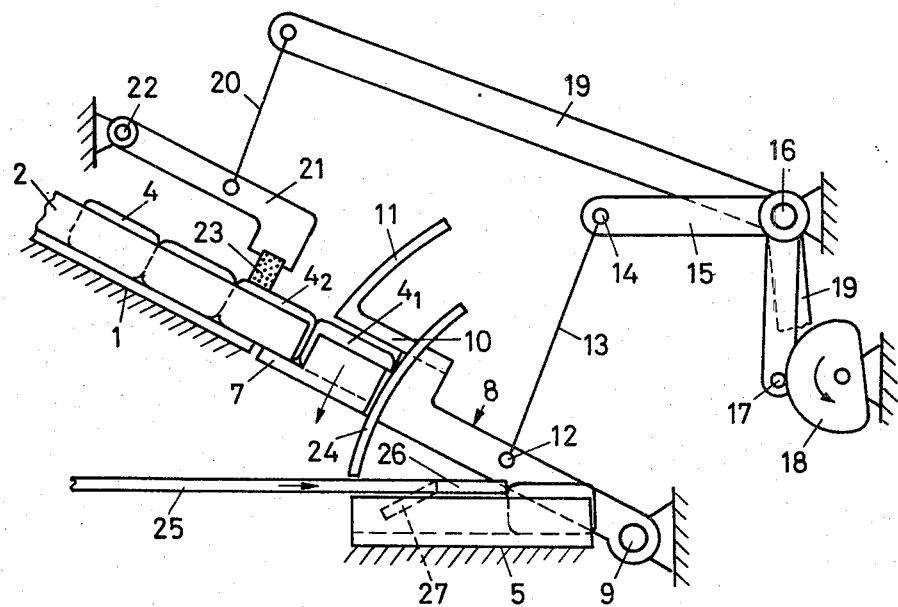
FIG. 1 is a side elevational view of a preferred embodiment of a separator device according to the invention.

The separator device shown in FIGS. 1–7 has a stationary, inclined inlet path 1 which is divided into three channels 3 by longitudinal partitions 2. Objects 4 whose length is to be monitored slide downwardly in the channels 3 of this inlet path 1. In the present case, the objects 4 have an approximately rectangular profile and are placed upright so as to rest on their long sides. The separator device further includes a discharge path 5 which, when seen in a plan view, is aligned with the inlet path 1 and is also provided with three channels 6.

The lowermost objects 4 traveling along path 1 reach a lower pivot plate 7 in groups of three. Pivot plate 7 is part of, and movable with, a pivot arm 8 which is pivotally mounted to a fixed frame at 9. The arm 8 is also provided with an upper pivot plate 10 which extends parallel to pivot plate 7 and which, at its edge facing away from the pivot axis 9, carries a circularly cylindrical sector, or pivot sector, 11 whose center of curvature coincides with the pivot axis 9.

A pulling element 13 has one end connected to a protrusion 12 of arm 8. The other end of pulling element 13 is connected to a protrusion 14 at the free end of one arm of a bell crank lever 15 pivoted to the frame at 16. At the free end of the other arm of lever 15 there is provided a follower element 17 which follows the circumference of a rotating control cam 18 so that, during one rotation of the cam, arm 8 is lowered once and then raised again into the illustrated position.

A second bell crank lever 19 is pivoted at 16 and is actuated, via one of its arms, by a second control unit, which can be similar to cam 18 and follower 17 and which is not shown. The free end of the other arm of lever 19 is connected to one end of a pulling element 20, the other end of element 20 being connected to an arm 21 which is pivoted to the frame at 22. At the free end of arm 21, a clamping strip 23 of an elastic rubber material is fastened by means of a holder so as to press, in the illustrated lowermost position of arm 21 and as a result of the weight of the latter possibly together with an additional spring force, onto the three objects $4_2$ disposed therebelow to thus retain those objects on the inlet path 1.

An abutment 24 in the form of a circularly cylindrical sector is also fastened to the frame and is oriented so that its center of curvature likewise coincides with the pivot axis 9 of arm 8. However, the radius of curvature of the circularly cylindrical sector 24 is smaller than that of the pivot sector 11.

Somewhat above the discharge path 5, there is provided a pusher 25 which is movable in the direction of the discharge path and which carries a head 26 that extends across the entire width of paths 1 and 5. The head 26 has a rear portion 27 which is slanted downwardly away from the object conveying direction and which is not visible in FIG. 2.

Figure 3:
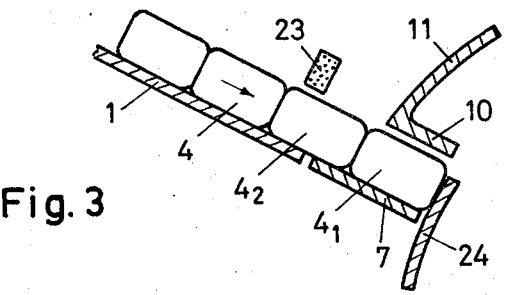
FIG. 3 is a cross-sectional detail view along the line III—III of FIG. 2, with the device in a first operating position and objects of normal length being present.
Figure 6:
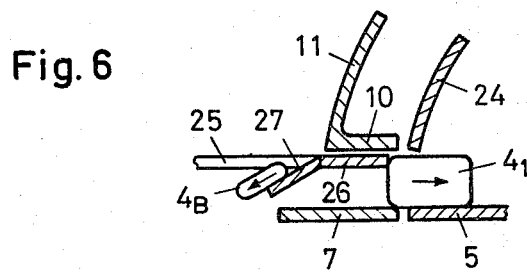
FIG. 6 is a view similar to that of FIG. 5 showing the device in a third operating position.
Figure 7:
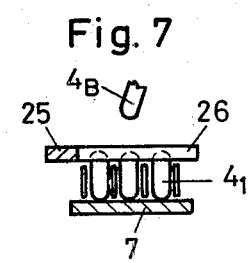
FIG. 7 is a cross-sectional detail view along the line VII—VII of FIG. 5.

The described separator device operates as follows. During every operating cycle, the clamping strip 23 is raised when the pivot arm 8 is in its upper position, as shown in FIG. 3, so that the objects 4 can slide downwardly on path 1 until the lowermost object $4_1$ in each channel 3 is held back by the stationary abutment sector 24 and comes to rest on the lower pivot plate 7. Then the clamping plate 23 returns to its clamping position so that objects $4_2$, which are immediately behind objects $4_1$, are held near their rear ends while arm 8 is pivoted downwardly to the position shown in FIG. 5 and back again. When arm 8 is at the bottom of its travel path, pusher 25 is moved, by suitable, standard drive means, in the direction of the arrows in FIG. 5 so that its head 26 moves all three objects $4_1$ from the lower pivot plate 7 to the discharge path 5, as shown in FIG. 6. There, known means (not shown) take over further conveyance of the objects.

Figure 4:
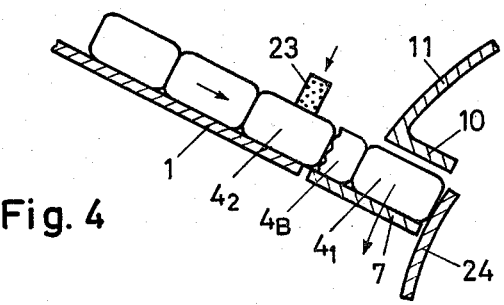
FIG. 4 is a view similar to that of FIG. 3, but with an unacceptably short object being present.
Figure 5:
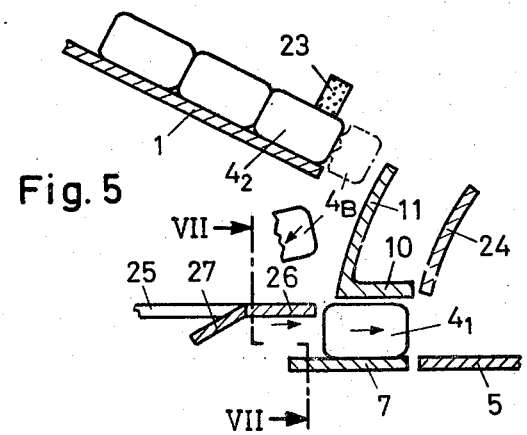
FIG. 5 is a view similar to that of FIG. 4, with the device in a second operating position.

FIG. 4 shows that a broken piece $4_B$ shorter in length than acceptable objects is disposed between objects $4_1$ and $4_2$ which are of regular length. Object $4_2$ is now retained, not in the vicinity of its rear end, but much farther forward. However, upon subsequent raising of the clamping strip 23, this does not prevent timely forward movement of the columns of objects. The broken piece $4_B$, which initially is still supported by the protruding end of the lower pivot plate 7, now drops downwardly approximately along the pivot sector 11 but descends much more slowly than objects $4_1$ which are propelled in a downward direction by the upper pivot plate 10. As can be seen from FIGS. 5, 6 and 7, the broken piece $4_B$ thus drops onto the pusher head 26 and is brushed away from it by the upper pivot plate 10 until the broken piece finally drops, as shown in FIG. 6, over the slanted portion 27 into a reject container (not shown).

Figure 2:
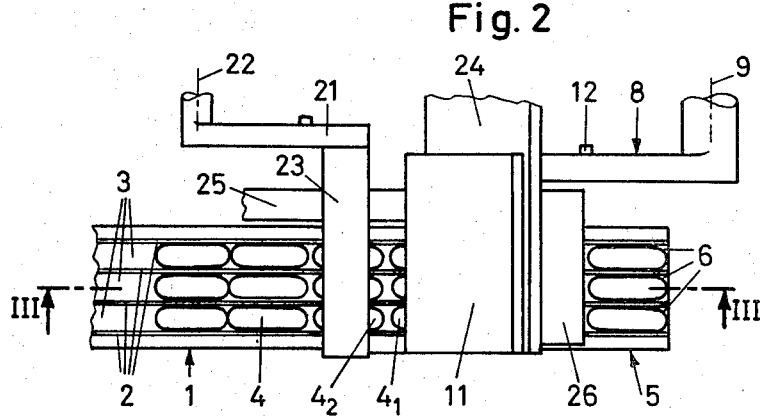
FIG. 2 is a plan view of the embodiment of FIG. 1.
Figure 8:
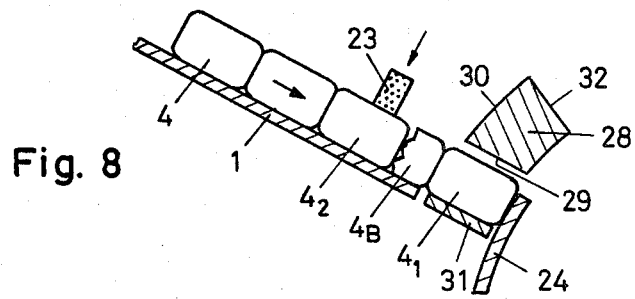
FIG. 8 is a view similar to that of FIG. 4 of a second embodiment of a separator device according to the invention, in a first operating state comparable to that of FIG. 4.
Figure 9:
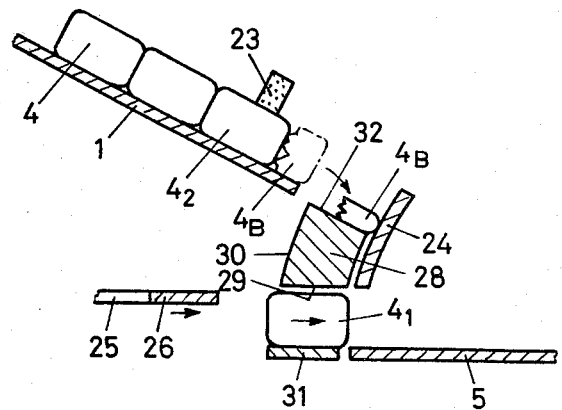
FIG. 9 is a view similar to that of FIG. 8 with the device in a second operating state.
Figure 10:
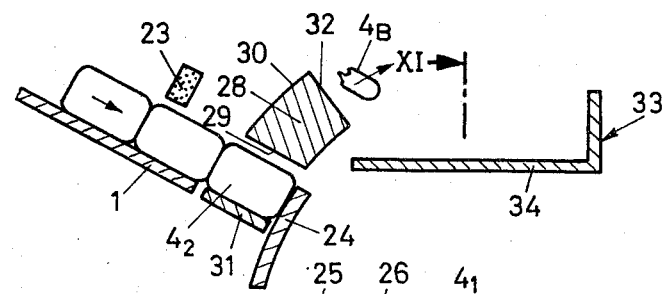
FIG. 10 is a view similar to that of FIG. 9 with the device in a third operating state.
Figure 11:
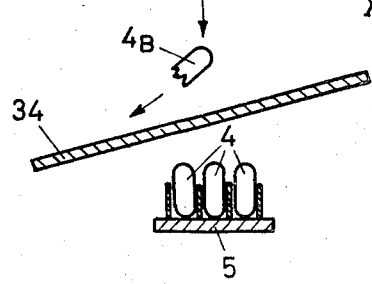
FIG. 11 is a cross-sectional detail view along line XI—XI of FIG. 10, but at a moment after that depicted in FIG. 10.

In the embodiment shown in FIGS. 8-11, a pivot block 28 is attached to the arm 8 shown in FIGS. 1 and 2 instead of the upper pivot plate 10, and the lower radial face 29 of block 28 takes over the function of the upper pivot plate while its outer peripheral surface 30 takes over the function of pivot sector 11. The lower pivot plate 31 which is also attached to arm 8 of FIGS. 1 and 2 is somewhat shorter than pivot plate 7, i.e. at most as long as one object $4_1$ of normal length. If now, as shown in FIG. 8, a broken piece $4_B$ is present between objects $4_1$ and $4_2$, it will drop onto the upper radial face 23 of pivot block 28 once the lower pivot plate 31 has been lowered to the level of discharge path 5. When the pivot arm 8 returns to its upper position, the broken piece will be thrown, as shown in FIG. 10, from face 32 of pivot block 28 into a collecting trough 33 disposed above outlet path 5. As shown in FIG. 11, the broken piece is ejected to the side by traveling along the bottom 34 of trough 33, which bottom is inclined transversely to the object conveying direction, to be collected in some reject container.

The above-described separator devices are not complicated and are very dependable in operation. In practice it is possible with this device to eject objects which are 10% shorter than normal and greater accuracy is not required since pieces which differ by less than 10% from normal size are acceptable and do not produce any malfunctions in the commonly employed packaging machines.

It will be understood that the above description of the present invention is susceptible to various modifications, changes and adaptations, and the same are intended to be comprehended within the meaning and range of equivalents of the appended claims.

What is claimed is:

1. A separator device arranged to be disposed in a conveying path for elongate objects each having a desired length, said device comprising means defining an inclined input path presenting at least one channel presenting an object support surface along which a succession of such objects slide downwardly in the direction of their longitudinal dimension; a fixed abutment member disposed downstream of, and in line with, said input path for limiting the movement of an object exiting from said channel; means defining a discharge path for discharging objects in succession from said device, said discharge path presenting an object support surface spaced below the lower extremity of said abutment member by a distance at least equal to the vertical dimension of each object; a pivotally movable plate located between the outlet end of said channel and said abutment member and movable between a raised position in which it is aligned with the support surface of said channel and a lowered position in which it is aligned with the support surface of said discharge path, movement of said movable plate from its raised to its lowered position acting to cause an object located between the outlet end of said channel and said abutment member to move downwardly while sliding along said abutment member into alignment with said discharge path; a pusher member movable for pushing an object which is thus aligned with said discharge path beneath said abutment member and onto said discharge path; a clamping strip movable between a retracted position in which it permits downward sliding movement of objects along said channel and a clamping position in which it blocks such movement, said strip being located relative to the outlet end of said channel such that, when an object having the desired length is positioned against said abutment member, and when said strip is in its clamping position, said strip will clamp the next following object if it has the desired length but not if it has less than the desired length; clamping control means connected to said strip to move it from its retracted position to its clamping position at the start of movement of said movable plate from its raised position to its lowered position in order to permit a next following object having less than the desired length to exit from said channel; and a movable member disposed for separating from the conveying path an object which has exited from said channel after the start of movement of said movable plate from its raised position to its lowered position.

2. An arrangement as defined in claim 1 further comprising a pivot lever mounted to pivot about a fixed fulcrum and having a free end which carries said movable plate.

3. An arrangement as defined in claim 2 further comprising a second movable plate carried by said lever at the free end thereof and located above said first-recited plate, said second plate being shorter, in the radial direction of said lever, than said first-recited plate, and an arcuate member secured to said second plate and extending upwardly from the edge of said second plate which faces said channel, and wherein said movable member constitutes a portion of said pusher member and, during movement of said first-recited plate to its lowered position, a next following object is guided from said first-recited plate by said arcuate member onto said movable member and is brushed off of said movable member by movement of said pusher member toward said discharge path.

4. An arrangement as defined in claim 3 wherein said pusher member comprises a pusher head and said movable member comprises a portion of said pusher head which is remote from said discharge path and which presents an upper surface that slopes downwardly away from said discharge path.

5. An arrangement as defined in claim 2 further comprising: a pivot block carried by said lever at the free end thereof and located above said pivot plate, said pivot block having the same length, in the radial direction of said lever, as said pivot plate, said block having a radially extending upper face onto which a next following object having less than said desired length can slide when said movable plate moves to its lowered position and from which such object is thrown during the subsequent movement of said plate back to its raised position; and a collecting trough disposed transversely above said discharge path and having a bottom which is inclined transversely to said discharge path, said trough being located to receive objects thrown from said block.

6. An arrangement as defined in claims 2, 3, 4 or 5 wherein said clamping strip is an elastic rubber body, and said clamping control means comprise a pivot arm having a free end carrying said strip, a second pivot lever pivotal about a second fixed fulcrum, and a first pulling member connected between said second lever and said pivot arm; and further comprising a third pivot lever pivotal about said second fulcrum and a second pulling member connected between said third lever and said first-recited lever.

* * * * *